United States Patent
Nogami et al.

(10) Patent No.: US 7,362,219 B2
(45) Date of Patent: Apr. 22, 2008

(54) INFORMATION ACQUISITION APPARATUS

(75) Inventors: Atsushi Nogami, Kanagawa-ken (JP);
Yoshio Iizuka, Kanagawa-ken (JP);
Naoki Nishimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 11/190,624

(22) Filed: Jul. 26, 2005

(65) Prior Publication Data
US 2006/0022814 A1    Feb. 2, 2006

(30) Foreign Application Priority Data
Jul. 28, 2004   (JP) .............................. 2004-220381
Jul. 28, 2004   (JP) .............................. 2004-220683

(51) Int. Cl.
*G08B 26/00*    (2006.01)
(52) U.S. Cl. ................ 340/505; 340/572.1; 340/572.4; 340/572.8; 235/384; 235/385; 382/181; 382/232; 382/257
(58) Field of Classification Search ................ 340/505, 340/572.1, 572.4, 572.8; 235/384, 385; 382/181, 382/232, 257
See application file for complete search history.

(56) References Cited

U.S. PATENT DOCUMENTS 6,992,587 B2 *  1/2006  Maeda et al. ............ 340/572.1
7,180,050 B2 *  2/2007  Imagawa et al. ........... 250/221

FOREIGN PATENT DOCUMENTS

| JP | 10-229351   | 8/1998 |
| JP | 2000-227948 | 8/2000 |
| JP | 2000-261751 | 9/2000 |

* cited by examiner

*Primary Examiner*—Tai Nguyen
(74) *Attorney, Agent, or Firm*—Morgan & Finnegan, L.L.P.

(57) ABSTRACT

When a plurality of objects having RFID tags attached are to be read, an image sensing unit performs image sensing, and at the same time an RFID reader reads an RFID tag within the image sensing range. A characteristic quantity (external appearance model) of an object obtained from a database on the basis of ID data of the RFID tag is compared with a characteristic quantity obtained by image processing of the sensed image, thereby acquiring information unique to the object. The object is discriminably specified by superimposing the acquired unique information on the object in the sensed image.

18 Claims, 19 Drawing Sheets

FIG. 4

| ID | NAME | CHARACTERISTIC QUANTITIES OF OBJECT | DATE OF MANUFACTURE |
|---|---|---|---|
| 00001 | Object01 | BLACK, CUBE | 04.02.02 |
| 00002 | Object02 | WHITE, CIRCULAR COLUMN | 04.03.04 |
| 00003 | Object03 | WHITE & BLACK, SPHERE | 04.03.15 |
| ⋮ | ⋮ | ⋮ | ⋮ |

FIG. 9
| ID | CHARACTERISTIC QUANTITIES OF OBJECT | | NAME |
|---|---|---|---|
| 00100 |  | BLACK, CIRCULAR COLUMN | Object020 |
| 00101 | 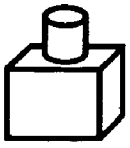 | WHITE, CIRCULAR COLUMN + CUBE | Object021 |
| ⋮ | ⋮ | | ⋮ |

FIG. 12

| RADIO FIELD INTENSITY | ENLARGEMENT / REDUCTION |
|---|---|
| 120 | 120% |
| 100 | 100% |
| 80 | 80% |
| 60 | 60% |
| 40 | 40% |
| 20 | 20% |

FIG. 16

| ZOOMING MAGNIFICATION OF SENSING | X-DIRECTION FEEDING RANGE OF ANTENNA | Y-DIRECTION FEEDING RANGE OF ANTENNA |
|---|---|---|
| 1.0 | ± 4 OR LESS | ± 4 OR LESS |
| 1.5 | ± 5 OR LESS | ± 5 OR LESS |
| 2.0 | ± 6 OR LESS | ± 6 OR LESS |
| 2.5 | ± 7 OR LESS | ± 7 OR LESS |
| 3.0 | ± 8 OR LESS | ± 8 OR LESS |

FIG. 17

| SENSING FOCAL DISTANCE (F-NUMBER) | ANTENNA OUTPUT LEVEL |
|---|---|
| 2.8 | 60% |
| 3.3 | 70% |
| 3.8 | 80% |
| 4.3 | 90% |
| 4.8 | 100% |

INFORMATION ACQUISITION APPARATUS

FIELD OF THE INVENTION

The present invention relates to a technique which acquires information of an object in a sensed image and discriminably specifies the object by using the radio frequency identification (RFID) technique and so on.

BACKGROUND OF THE INVENTION

The radio frequency identification (RFID) technique identifies an RFID tag (or an IC tag, IC card, or the like) by externally reading data such as an identifier of the tag in a non-contact manner by using an electromagnetic wave. Various application fields are possible by embedding a writable memory in the tag or combining the tag with a sensor. The RFID tags are roughly classified into an active tag (equipped with a power supply) and a passive tag (equipped with no power supply) in accordance with whether a tag has a power supply (battery).

With the advance of the downsizing technique, the passive RFID tag which operates by an electromagnetic wave supplied from an external apparatus is rapidly expanding its application fields in recent years. Well-known examples are a non-contact IC card type pass and entrance card.

It is also possible to adhere the RFID tag contained in a seal to an article, and automatically detect the existence and stored information of the RFID tag by an RFID reader installed in a location where the article is placed or near the entrance/exit of a room, thereby preventing unauthorized takeout or theft of the article. In addition, there is a plan which uses this RFID tag in efficient article management in all stages (production, distribution, and sale) of supply chain management, as the next-generation article identification technique instead of barcodes.

The transmitting power of many passive RFID tags described above is weak, so these tags can be read only in the vicinity (about a few cm to a few tens of cm) of the RFID reader. However, active RFID tags can be read from a relatively remote place (to about a few m) because the transmitting power is high.

When the RFID tags are attached to many articles, a plurality of RFID tags exist within the reading range of the RFID reader. In the conventional general system, pieces of information of a plurality of RFID tags existing within the reading range of the RFID reader can be simultaneously read, but it is impossible to determine to which object each read information belongs.

To solve this problem, Japanese Patent Laid-Open No. 10-229351 (prior art 1) discloses a system in which a specific RFID tag is irradiated with a directional optical signal, and only the RFID tag having received the optical signal transmits information on an electromagnetic wave to a reader.

Also, Japanese Patent Laid-Open No. 2000-227948 (prior art 2) discloses a system in which an RFID tag emits light, and the position of this RFID tag is detected on the basis of an image sensed by an image sensor. This method makes it possible to relate information of each RFID tag to its position information, and determine one of a plurality of RFID tags from which information is being read.

In this system, however, the position of an RFID tag is detected by using light. Therefore, if an RFID tag is located in a hidden position, it is impossible to detect the position of this RFID tag and specify it. Also, a function of receiving or emitting light must be added to an RFID tag, and this extremely complicates the structure of the RFID tag. To attach RFID tags to all articles, each individual RFID tag is desirably simple in arrangement and inexpensive.

SUMMARY OF THE INVENTION

The present invention has been made in consideration of the above problems, and has as its object to specify an object in a sensed image so that the object can be discriminated by its predetermined information.

It is another object of the present invention to make an object in a sensed image visually readily understandable by a human and widely applicable.

It is still another object of the present invention to make it possible to detect an object and determine its existing position even if a tag is located in an invisible position or the object is partially obstructed.

It is still another object of the present invention to reduce the load of the object detecting process or the existing position determination process.

To achieve the above objects, according to an aspect of the present invention, there is provided an information acquisition apparatus having a sensing device configured to sense an object, and a reading device configured to read information of a tag attached to the object, comprising: an extracting device configured to extract information concerning a characteristic of an object in an image sensed by the sensing device; and a discrimination device configured to discriminate a position of the object corresponding to the information of the tag read by the reading device, on the basis of the information concerning the characteristic of the object in the sensed image extracted by the extracting device and the information of the tag read by the reading device.

According to another aspect of the present invention, there is provided an information acquisition apparatus processing method comprising: an extraction step of extracting information concerning a characteristic of an object in a sensed image; an identification step of identifying information of a tag attached to the object in the sensed image; and a discrimination step of discriminating a position of the object corresponding to the information of the tag identified in the identification step, on the basis of the information concerning the characteristic of the object in the sensed image extracted in the extraction step, and the information of the tag identified in the identification step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows information stored in a database according to the first embodiment;

FIG. 9 shows information stored in the database according to the first embodiment;

FIG. 12 is a table showing a practical example of a correspondence table of the radio field intensity from an RFID tag and the enlargement or reduction ratio of the characteristic quantity of an object;

FIG. 16 is a view showing a practical example of the correspondence of the zooming magnification of image sensing as one sensing parameter to the feeding range of the antenna as one RFID read parameter;

FIG. 17 is a view showing a practical example of the correspondence of the focal distance (F-number) of image sensing as one sensing parameter to the output level of the antenna as one RFID read parameter;

DETAILED DESCRIPTION OF THE PREFERRED EMBODIMENTS

Preferred embodiments of the present invention will now be described in detail in accordance with the accompanying drawings.

First Embodiment

Figure 1:
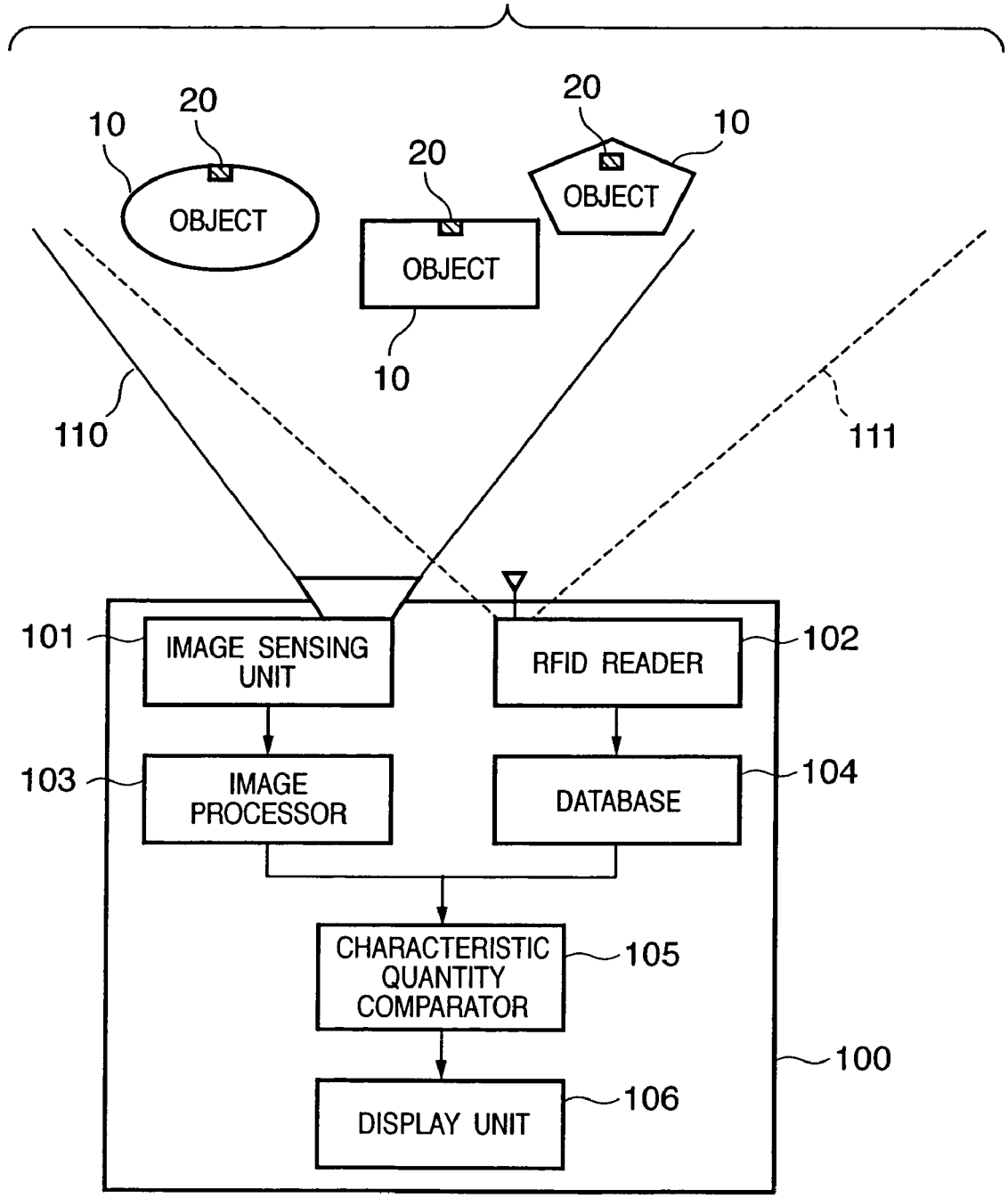
FIG. 1 is a block diagram of an object information acquisition system according to the first embodiment.
Figure 2:
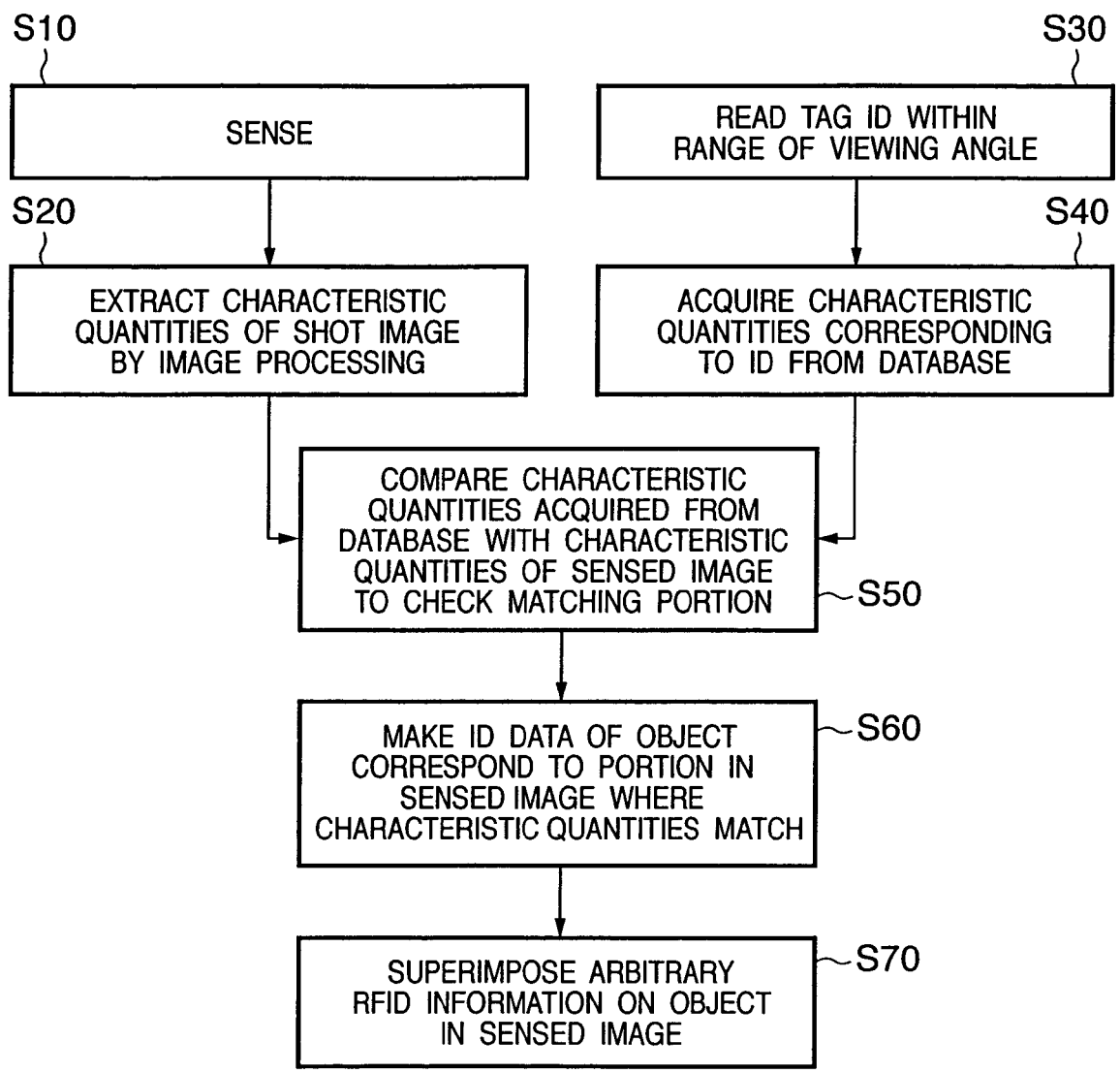
FIG. 2 is a flowchart of the object information acquisition system according to the first embodiment.

FIG. 1 is a block diagram of an object information acquisition system according to the first embodiment. FIG. 2 is a flowchart of processing in the object information acquisition system according to the first embodiment. FIG. 1 shows an object information acquisition system 100 in which constituent elements are integrated. However, it is not particularly necessary to integrate these constituent elements, and the system may also communicate, where necessary, with a constituent element installed in another place through wire or by wireless. As shown in FIG. 1, the object information acquisition system 100 includes the following constituent elements.

An image sensing unit 101 senses objects 10 within the range of a viewing angle 110. An RFID reader 102 has a directional antenna for communicating only with RFID tags in a specific direction by radio. A range (direction range of the antenna) 111 in which a radio field emitted from the antenna radiates has directivity equivalent to the viewing angle 110 of the image sensing unit 101. By this directivity of the antenna, only RFID tags existing within the range of a sensed image are read.

An image processor 103 receives data of the sensed image from the image sensing unit 101, and automatically extracts the characteristic quantities, such as the edge, the color, the luminance, the texture, the presence/absence of a motion, the shape, and the distance between characteristic points, of the sensed image, by using a predetermined image processing algorithm.

A database 104 prestores IDs unique to individual objects, and unique information (e.g., the name, price, model number, or image information) related to the objects. The database 104 also prestores the characteristic quantities of the external appearance, e.g., the edge, the color, the luminance, the texture, the presence/absence of a motion, the shape, and the distance between characteristic points, of an object. The characteristic quantities are prepared by sensing an image of each of various objects in various directions, and modeling the characteristics of the outer appearance of the object.

A characteristic quantity comparator 105 acquires, from the database 104, only information corresponding to ID data of an RFID tag 20 read by the RFID reader 102. The acquired information contains characteristic quantity information of an object to which the RFID tag is attached, and information (e.g., the name) unique to the object. The characteristic quantity comparator 105 compares the characteristic quantities of an object acquired from the database 104 with the characteristic quantities of a sensed image acquired by the image processor 103, and determines the position of the object in the sensed image. The characteristic quantity comparison sequence is as follows. That is, the characteristic quantities, such as the edge, the color, the luminance, the texture, the presence/absence of a motion, the shape, and the distance between characteristic points, unique to the object acquired from the database 104 are compared with the characteristic quantities, such as the edge, the color, the luminance, the texture, the presence/absence of a motion, the shape, and the distance between characteristic points, of the sensed image obtained by the image processor 103, and a most matching portion is checked. If a matching portion is found, the ID data of the object and the position in the image are stored so that they correspond to each other. If a plurality of ID data is read by the RFID reader 102, the above sequence is repeated the same number of times as the number of the read ID data. As a consequence, a plurality of objects to which RFID tags are attached can be discriminated in the image. Note that if a plurality of ID data is read, information may also be simultaneously acquired from the database 104.

A display unit 106 displays, to the user, image data, information indicating the correspondence of ID data of an object with the position in an image, and information unique to the object, by methods suited to the individual data. That is, the display unit 106 displays a sensed image, and, in a position of the sensed image where an object exists, displays information corresponding to the ID data by characters, or by converting the information into an icon or graph. If a plurality of pieces of information is stored as they correspond to the ID data of the read RFID tag, the user may also freely change the contents of information to be displayed, by using an input device (not shown).

With this arrangement, it is possible to discriminate between objects to which RFID tags are attached, without adding any special function to these RFID tags. An example of an operation of determining the positions of a plurality of objects according to the first embodiment will be described below with reference to FIGS. 2, 3, 4, and 5.

Figure 3:
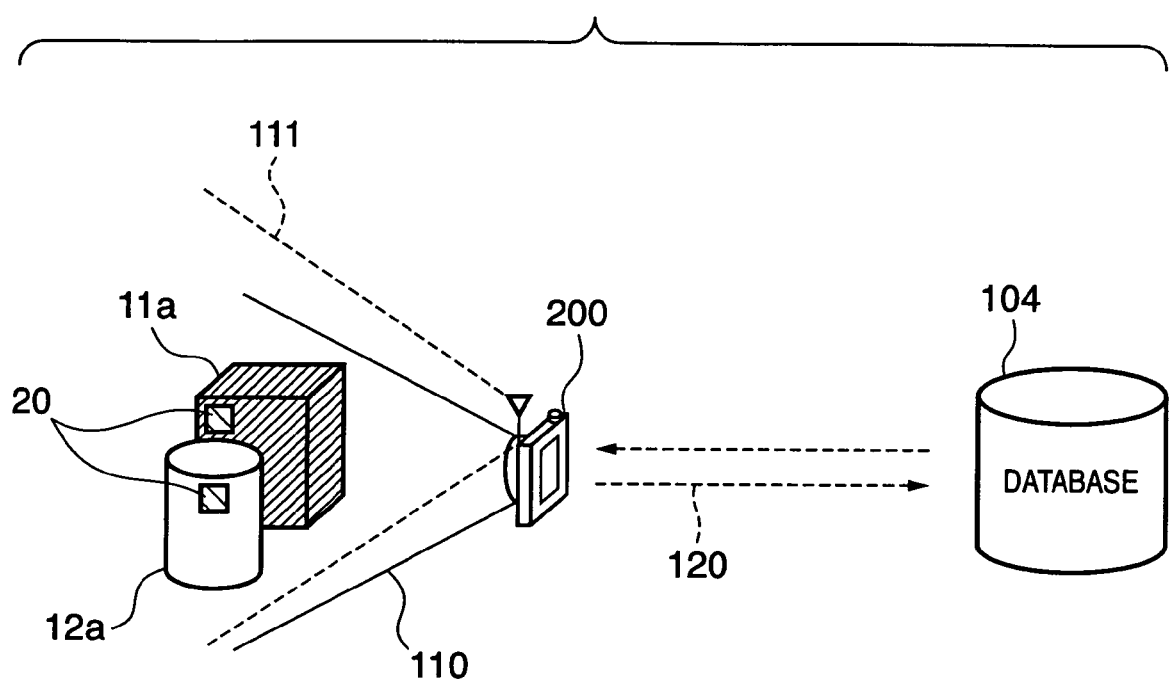
FIG. 3 is a view showing a practical operation example of the object information acquisition system according to the first embodiment.

FIG. 3 is a view showing a form in which an external database 104 is accessed by wired or wireless communication 120. An object information acquisition system 200 shown in FIG. 3 includes an image sensing unit 101, RFID reader 102, image processor 103, characteristic quantity comparator 105, and display unit 106.

Note that although one function is placed outside the system 200, the whole system is similar to FIG. 1. In front of the object information acquisition system 200, objects 11a and 12a having RFID tags 20 attached and different in external appearance exist.

FIG. 4 is a view showing an example of data of objects prestored in the database 104. In this example, the ID data and characteristic quantities (external appearance information of an object) of each object are stored. In addition, the name and the date of manufacture are recorded as examples of data unique to the object. To simplify the explanation, the characteristic quantities of, e.g., Object01 are "black, cube". In practice, however, detailed data which indicates, by numerical values, the edge, the color, the luminance, the texture, the presence/absence of a motion, the shape, the distance between characteristic points, and the like, is used.

In the object information acquisition system 200, when the image sensing unit 101 senses image (step S10 in FIG. 2), the RFID reader 102 reads information (ID data) of the two RFID tags 20 in substantially the same range (step S30). Data of the characteristic quantities of objects corresponding to the ID data read from the RFID tags 20 and information (in this case, information of the name and the date of manufacture) unique to the objects are acquired from the database 104 (step S40).

In the first embodiment, the object information acquisition system 200 has a wired or wireless communication function in order to communicate with the database 104 installed outside. In the example shown in FIG. 3, ID "00001" and ID "00002" of the RFID tags 20 are read by the RFID reader 102, so unique information and characteristic quantity data of ID "00001" and ID "00002" are retrieved from the database 104. Although information of ID "00003" is also stored in the database 104, this information is not acquired because the corresponding ID data is not read by the RFID reader 102.

The image processor 103 processes the sensed image by a predetermined algorithm to extract the characteristic quantities of the image (step S20). The characteristic quantity comparator 105 compares the characteristics extracted from the sensed image by the image processor 103 with the characteristic quantities retrieved from the database 104 (step S50), thereby determining the positions of the objects in the image (step S60). In the example shown in FIG. 3, the characteristic quantity data of ID "00001" indicates that a black cube is an object of ID "00001", so it is possible to determine that a portion indicating the characteristics "black, cube" in the whole image is a portion where the object of ID "00001" exists. This information of the position where the object exists in the image is recorded so as to correspond to the ID data ("00001") of the object. Subsequently, when the characteristic quantities of the sensed image are similarly checked on the basis of the characteristic quantity data "white, circular column" of ID "00002", it is also possible to determine a portion of an object of ID "00002". The position information of the object in the image and the ID data are stored together for ID "00002" as well.

By the above processing, the object information acquisition system 200 can acquire the ID data of each object, the information unique to the object, and the information indicating the correspondence of the ID data of the object with its position in the image. The display unit 106 displays these pieces of information together to present information display readily seen by a human (step S70).

Figure 5:
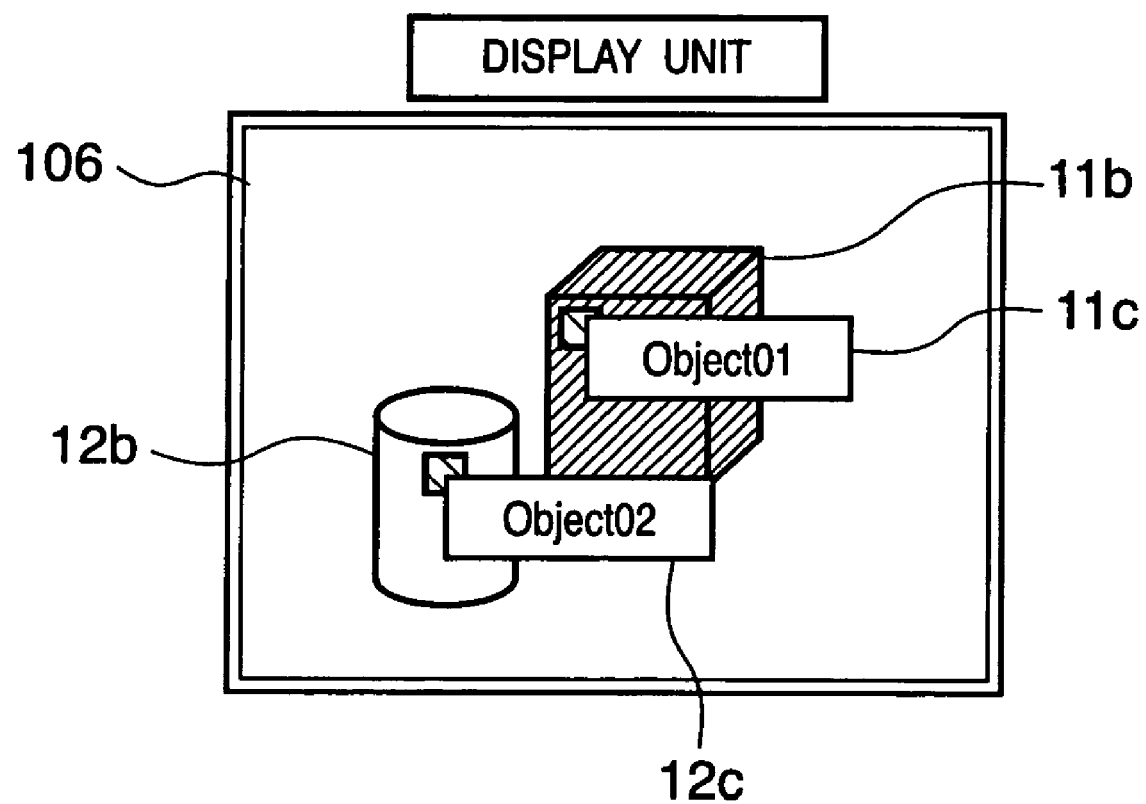
FIG. 5 is a view showing a display example on a display unit according to the first embodiment.

That is, as shown in FIG. 5, information 11c and information 12c of objects 11b and 12b are superimposed on portions where these objects exist in the sensed image. In this example, pieces of information (Object01, Object02) of the names of the objects are superimposed. With this display, the user can easily recognize to which object the information read from the RFID tag belongs.

Figure 6:
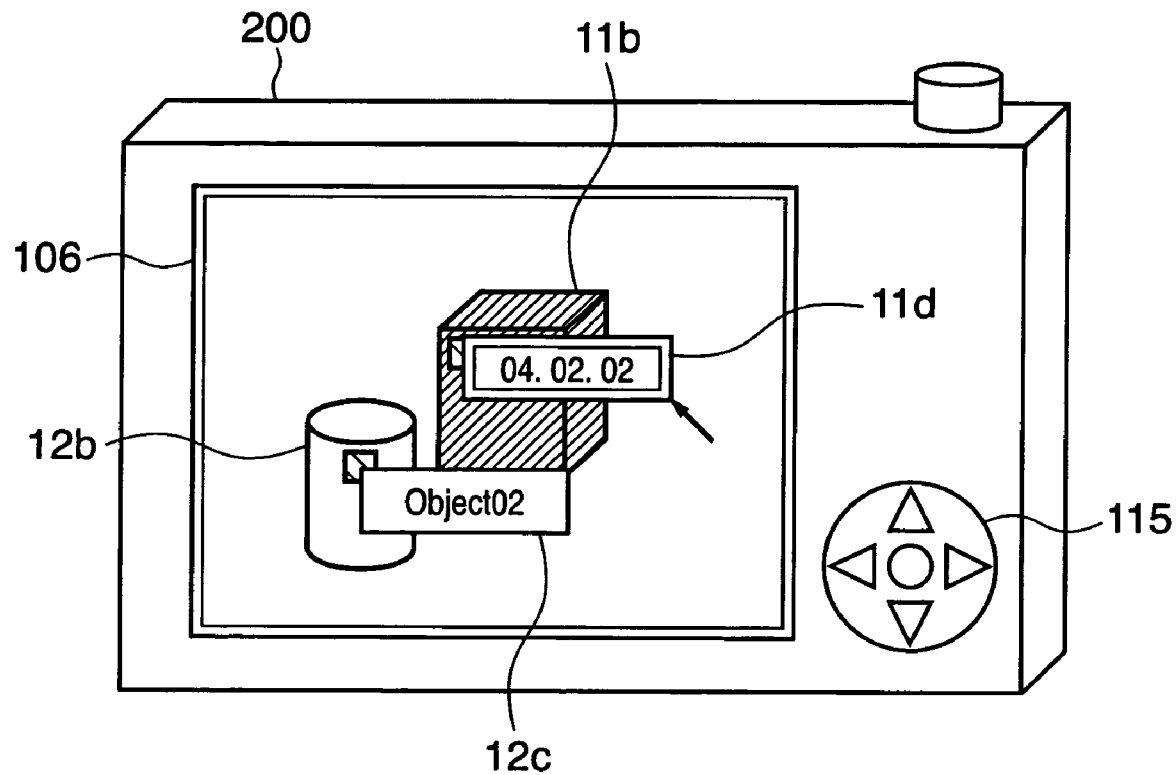
FIG. 6 is a view showing switching of information display according to the first embodiment.

In the first embodiment, information of the date of manufacture can also be retrieved from the database 104, so this date-of-manufacture information may also be superimposed on the display. It is also possible to display a plurality of pieces of information at the same time or by switching them. FIG. 6 is a view showing an example in which information display 11d is switched to another. For this switching, an input portion for designating switching is necessary. In the preferred example, pieces of information of a specific object in an image can be switched by using a pointing device 115. This pointing device can be any of a mouse, track pad, track ball, and touch panel, i.e., the type of the device is not limited. As another form of information display, it is also possible to prepare icons, graphs, or computer graphics in the database, and display them. By the use of the pointing device and/or icons or the like, it is possible to provide an object information acquisition system which is visually readily understandable and widely applicable.

In the first embodiment, even when a plurality of simple RFID tags is simultaneously read, it is possible to determine to which object each read information belongs.

In an actual operation, an object rarely independently exists in an image without being obstructed by anything. However, it is possible to detect the position of even an object slightly obstructed by another object or by a surrounding irrelevant article. That is, if even a portion of an object exists in a sensed image, the characteristic quantities of the portion are compared with those of an object obtained from the database 104. If the characteristic quantities are partially similar, it is determined that the object exits in this portion. In this manner, even when an RFID tag itself is completely invisible from the reader, the position of the object can be determined. That is, in the conventional technique which determines a position by using light, an RFID tag must be located in a position visible from the reader. In the first embodiment, however, it is possible to read an RFID tag intentionally located in a hidden position, or to read an RFID tag in a direction other than a surface to which the tag is attached.

Figure 7:
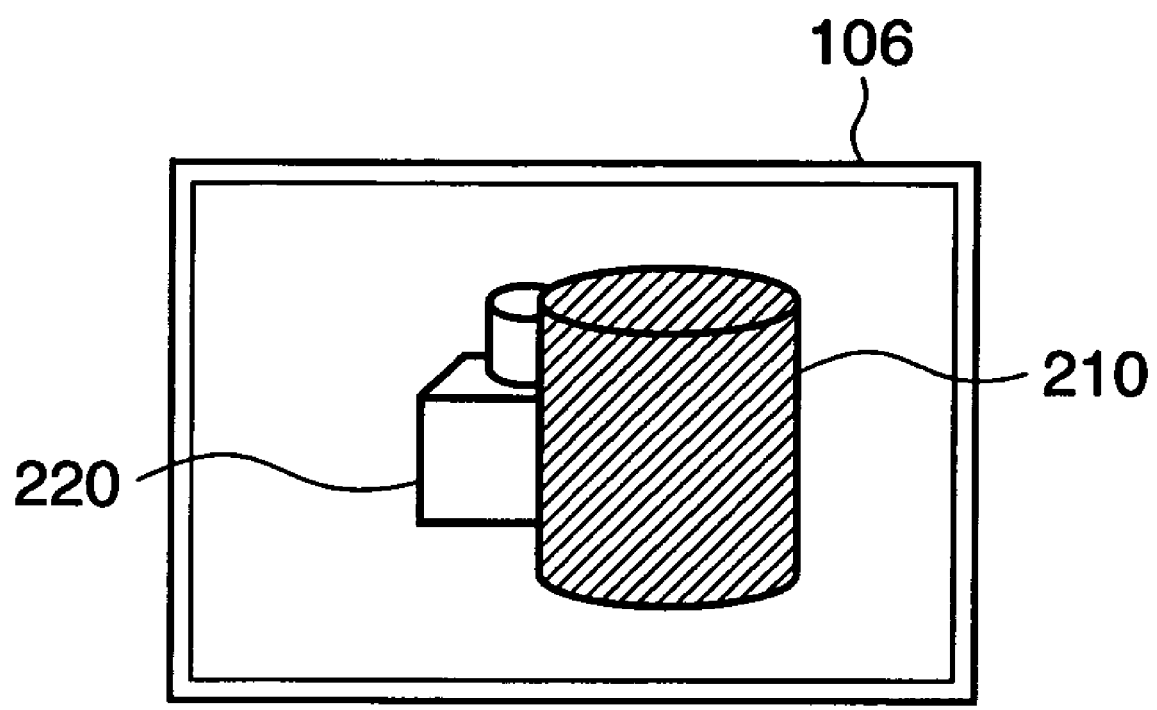
FIG. 7 is a view showing a sensed image in the object information acquisition system according to the first embodiment.
Figure 8:
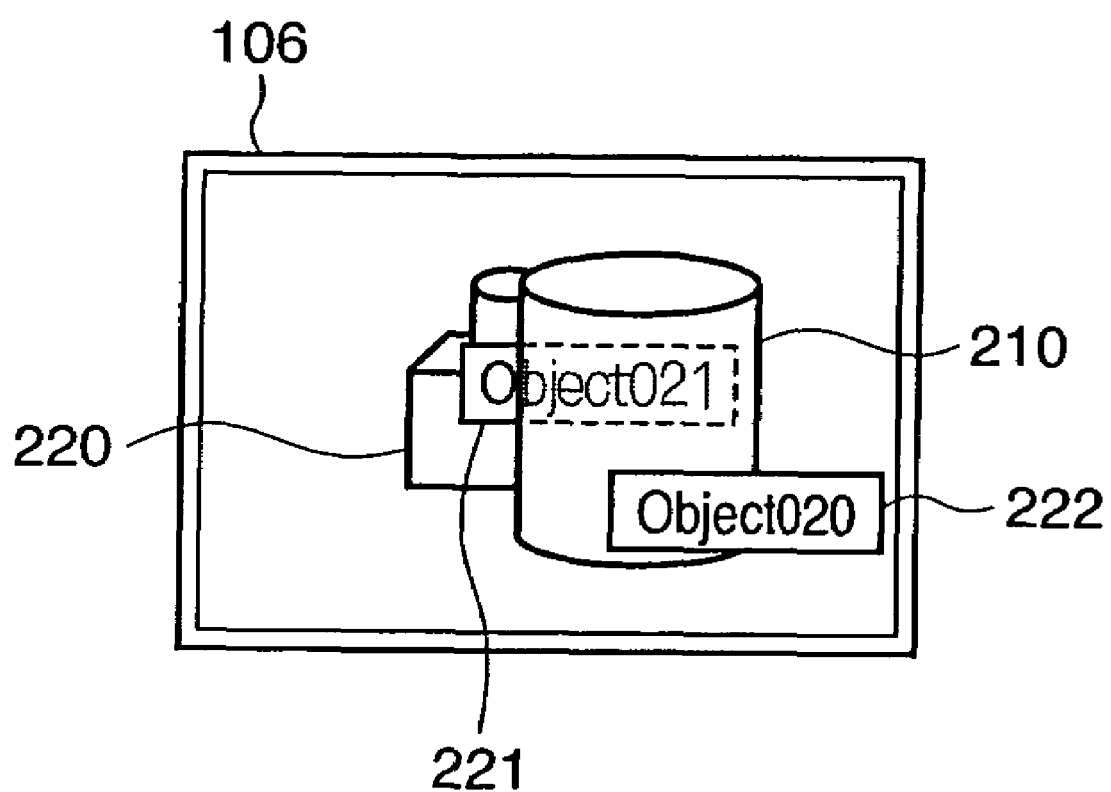
FIG. 8 is a view showing a display example on the display unit of the object information acquisition system according to the first embodiment.

FIGS. 7, 8, and 9 are views showing the way an object partially obstructed by another object is detected. FIG. 7 is a view showing the state in which objects shot by the image sensing unit 101 are displayed on the display unit 106. The RFID reader 102 reads RFID tags (not shown) attached to two objects 210 and 220. The RFID tag of the object 210 has ID data "00100", and the RFID tag of the object 220 has ID data "00101". The characteristic quantities of objects corresponding to these ID data and data (name data) unique to these objects are read out from the database 104 (FIG. 9). The characteristic quantities of the object 210 are "black, circular column". Therefore, the position of the object in the image can be simply determined by comparison with characteristic quantities obtained by processing the shot image.

On the other hand, the object 220 is partially hidden behind the object 210, so characteristic quantities "white, circular column+cube" do not completely match the characteristic quantities obtained by the image processor 103. Although a portion is hidden in the image, however, a characteristic structure, i.e., a connected structure of a circular column and cube, of the object 220 is clearly seen. In addition, another portion of the image matches the characteristic quantities of the object 220. Therefore, it is possible to determine at a high probability that this portion is the object 220. FIG. 8 is a view showing an image displayed on the display unit 106 as a result of the comparison of the characteristic quantities described above.

Furthermore, there is a case in which an object is completely obstructed by something and does not appear in a shot image at all, but an RFID tag can be read. In this case, the position of the object in the image cannot be specified, so the display unit 106 displays a message indicating that the position in the image cannot be determined, and information unique to the object. By this display, the user can understand that the object exists in an invisible portion of the image.

From the viewpoint of image processing as well, comparison with prepared characteristic quantities can be performed extremely easily. That is, when characteristic quantities are compared only by image processing, all stored model images must be compared with a sensed image. In the first embodiment, however, objects existing in an image can be limited by ID data read from RFID tags. This makes it possible to narrow down characteristic quantities to be used in comparison to minimum necessary quantities. As a consequence, the load of image processing can be greatly reduced. In addition, if matching has failed when performed only by image processing, it is determined that there is no object. For example, if an object is hidden behind a foreground, it is difficult, by image processing alone, not only to specify the position of the object, but also to determine the existence of the object. In the first embodiment, however, the existence of an object can be obtained by an RFID tag. Therefore, even when an object cannot be specified in an image, the existence of the object can be displayed.

Second Embodiment

The second embodiment of the present invention will be described in detail below with reference to the accompanying drawings.

FIGS. 10, 11A, 11B, and 12 are views showing the second embodiment. As the second embodiment, a process of estimating the distance between an object information acquisition system and an RFID tag from the intensity of a received radio field from the RFID tag, estimating the size of an object in an image, and performing matching of the characteristic quantities of the object will be explained below.

An object information acquisition system of the second embodiment has a characteristic quantity adjusting unit (not shown) in addition to the object information acquisition system 100 (200) of the first embodiment.

Figure 10:
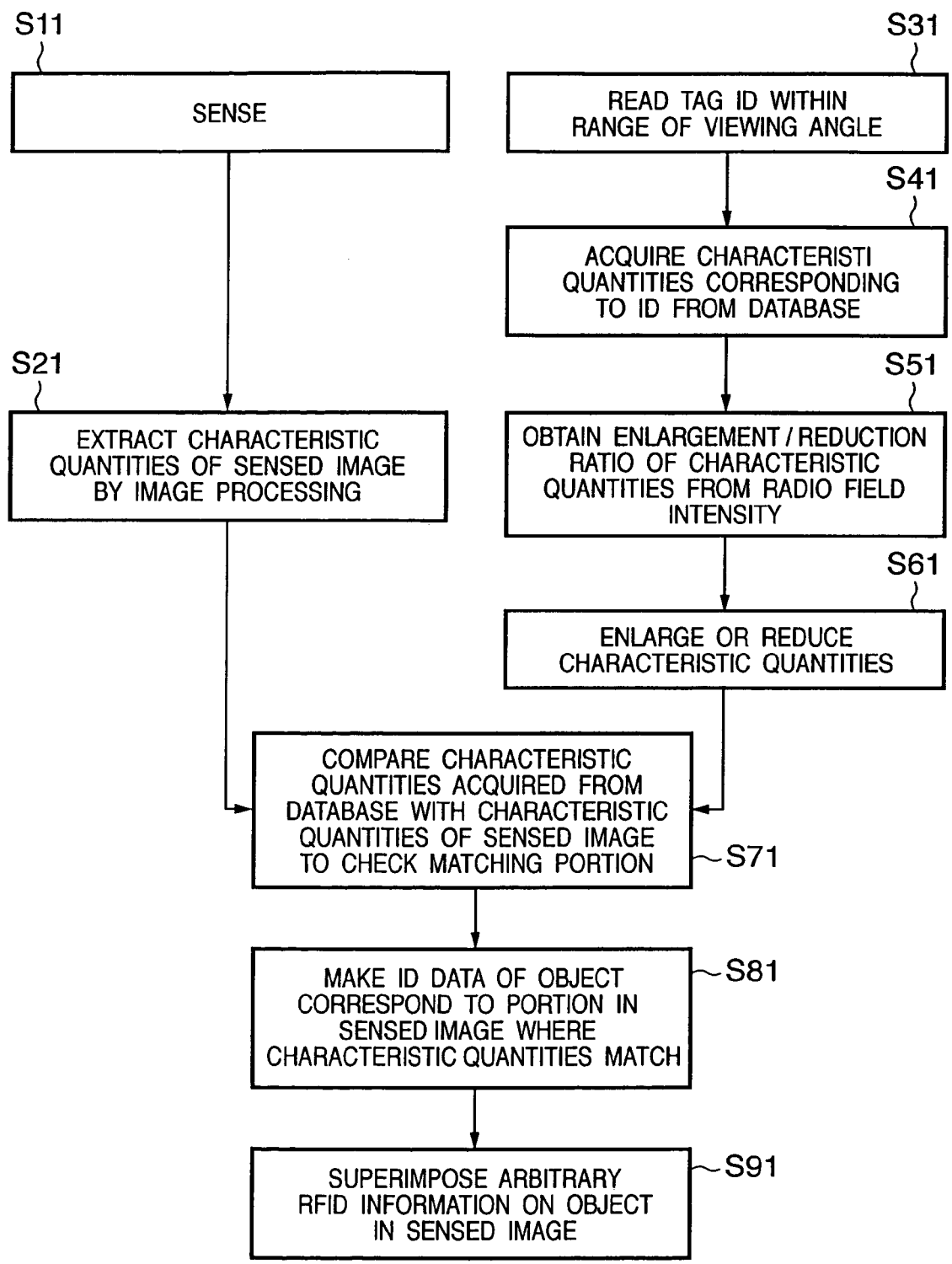
FIG. 10 is a flowchart of an object information acquisition system according to the second embodiment.

FIG. 10 shows the flow of processing in the second embodiment.

Sensing (step S11), extraction of characteristic quantities by image processing (step S21), read of RFID tags (step S31), and acquisition of characteristic quantities of objects from a database (step S41) are the same as in FIG. 2. Different processes are as follows. The characteristic quantity adjusting unit obtains the enlargement or reduction ratio of the characteristic quantities of an object from the radio field intensity when ID data of an RFID tag is read (step S51), and the characteristic quantities are enlarged or reduced by this enlargement or reduction ratio (step S61). In addition, a characteristic quantity comparator obtains the position of the object in the sensed image by comparing the enlarged or reduced characteristic quantities of the object with the characteristic quantities of the image (step S81), and displays the position on a display unit 106 (step S91).

The enlargement or reduction ratio is obtained by checking changes in radio field intensity and changes in size of an object in an image beforehand, and forming and storing a correspondence table. FIG. 12 shows an example of the correspondence table for enlarging or reducing the characteristic quantities of an object. A database 104 stores characteristic quantities corresponding to sizes when the radio field intensity is 100. This correspondence table can be formed for each object and stored in the database 104, and can also be formed by generalizing all objects and stored in the characteristic quantity adjusting unit.

Figure 11A:
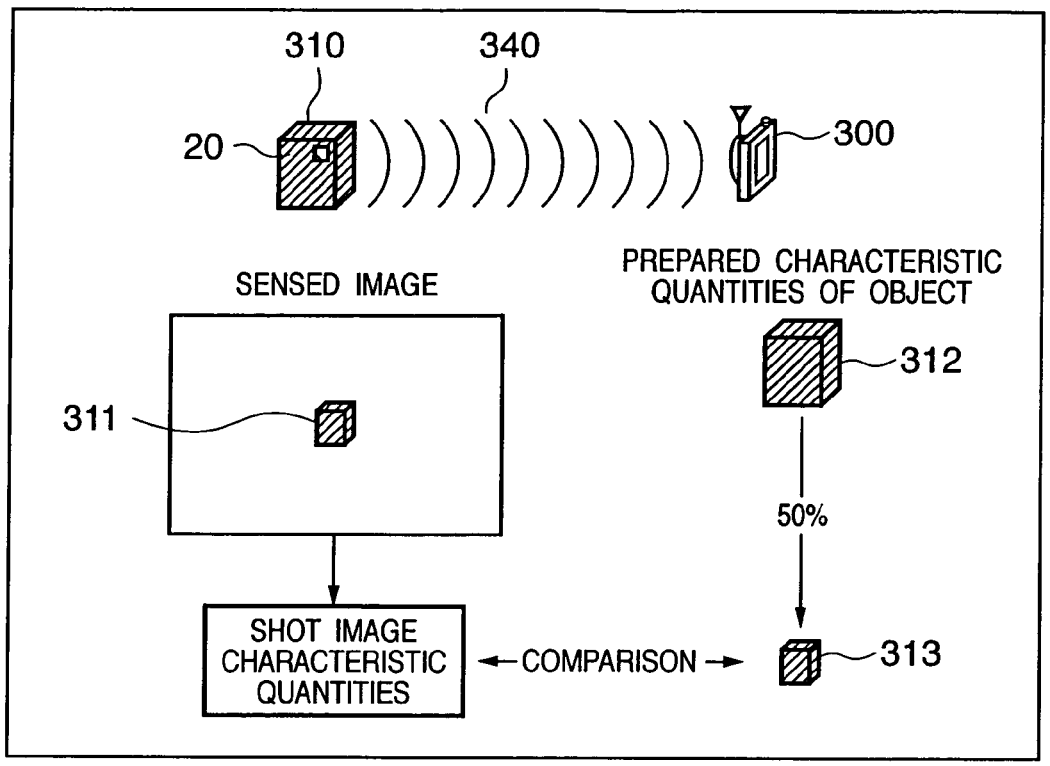
FIGS. 11A and 11B are views showing practical operation examples of the object information acquisition system according to the second embodiment.
Figure 11B:
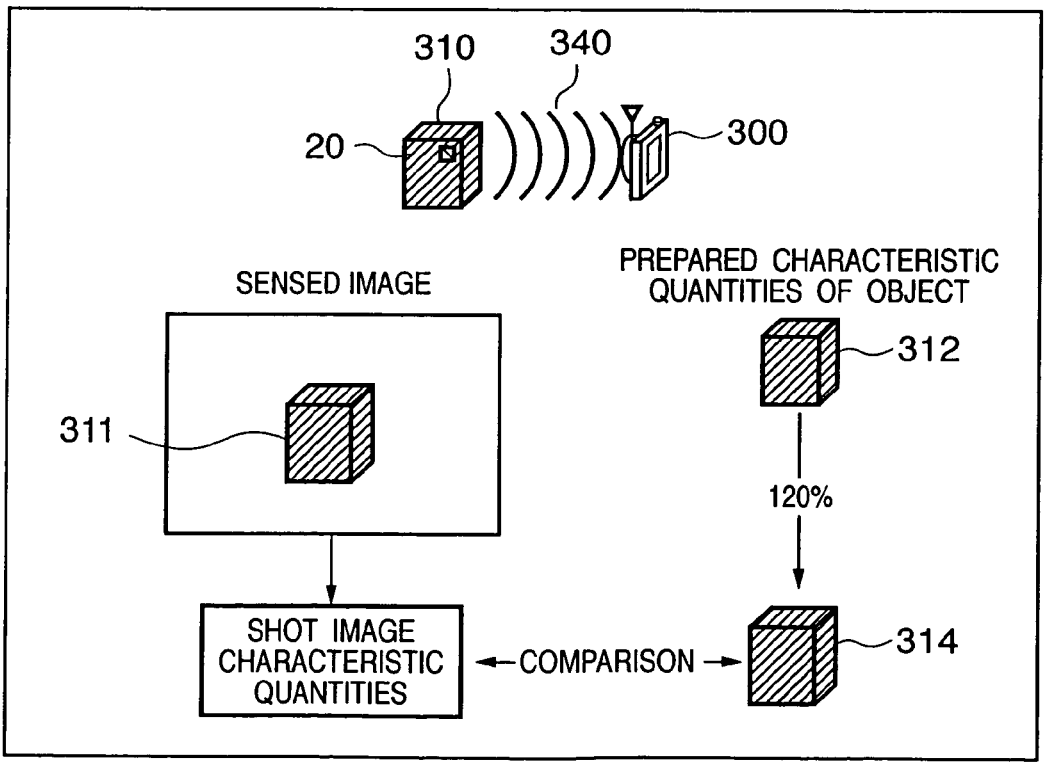

FIGS. 11A and 11B show practical examples of the above processing. Referring to FIGS. 11A and 11B, an object information acquisition system 300 has a characteristic quantity adjusting unit (not shown) in addition to an image sensing unit 101, RFID reader 102, image processor 103, database 104, characteristic quantity comparator 105, and display unit 106 in the first embodiment.

FIGS. 11A and 11B illustrate cases in each of which an RFID tag 20 is read while the distance between an object 310 to which the RFID tag 20 is attached and the object information acquisition system 300 is changed. As shown in FIG. 11A, if radio field intensity 340 from the RFID tag 20 is low, the object 310 is far from the RFID reader 102. Therefore, if the image sensing unit 101 is installed adjacent to the RFID reader 102, the object 310 is far from the image sensing unit 101 as well. That is, the object is presumably sensed in a relatively small size in an image, so the characteristic quantity of the object 310 obtained from the image is also small. Accordingly, the reduction ratio of the characteristic quantity of the object is obtained from the radio field intensity and correspondence table, a characteristic quantity 312 of the object 310 read out from the database 104 is reduced to obtain a characteristic quantity 313, and the characteristic quantity 313 is compared with the characteristic quantity of an object 311 sensed in a small size. This facilitates the comparison. On the other hand, if the radio field intensity from the RFID tag 20 is high, as shown in FIG. 11B, the object is sensed in a large size in the sensed image. Therefore, the characteristic quantity 312 of the object 310 read out from the database 104 is enlarged to form a characteristic quantity 314, and the characteristic quantity 314 is compared with the characteristic quantity of the object 311 sensed in a large size.

As described above, it is possible, by enlarging or reducing the characteristic quantity in accordance with the radio field intensity, to increase the accuracy of detection of the position of an object in an image, or reduce the processing load of an arithmetic unit.

Third Embodiment

The third embodiment according to the present invention will be described in detail below with reference to the accompanying drawings.

Figure 13:
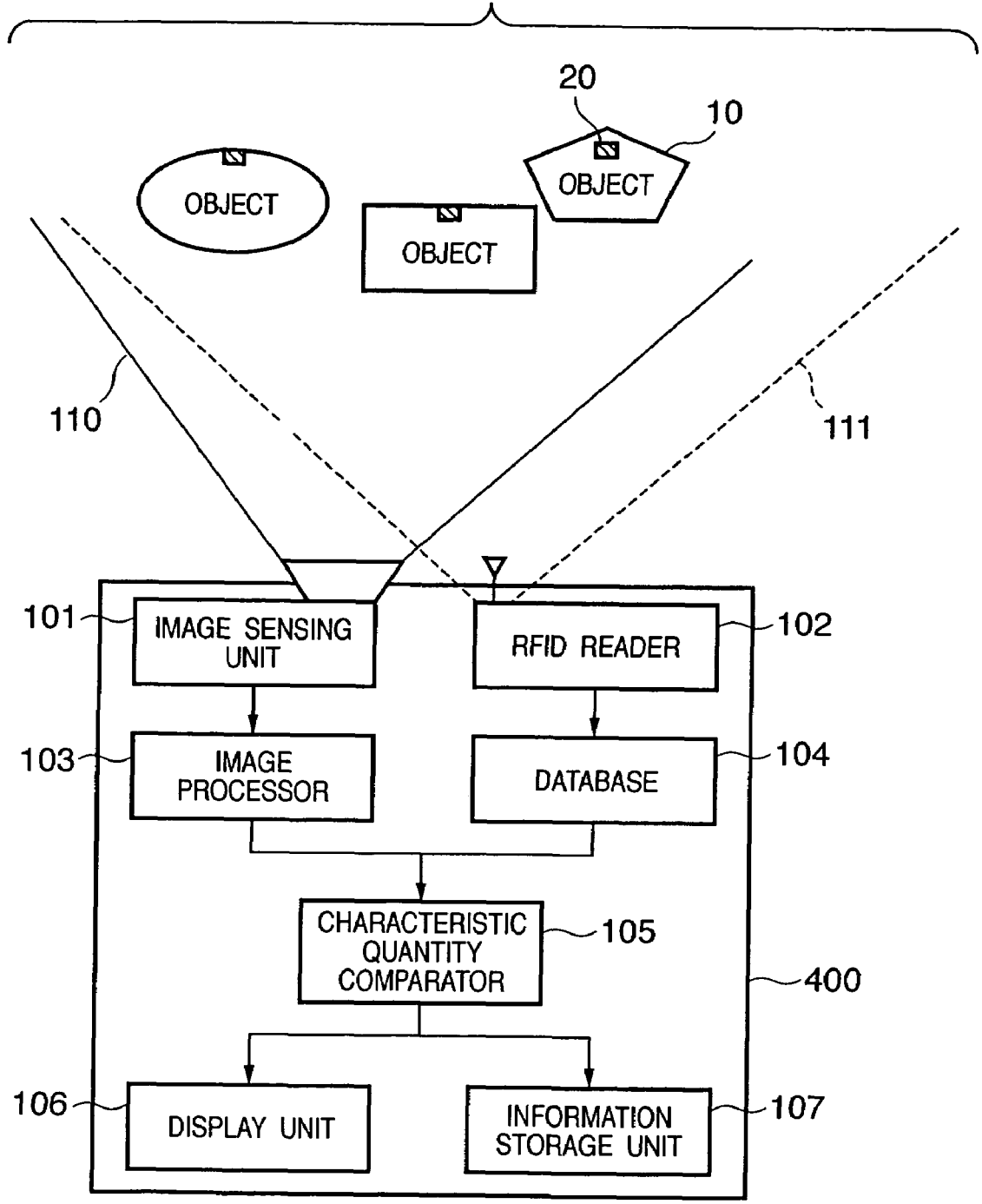
FIG. 13 is a block diagram of an object information acquisition system according to the third embodiment.

FIG. 13 is a block diagram of an object information acquisition system according to the third embodiment. Referring to FIG. 13, an object information acquisition system 400 has an information storage unit 107 for storing combined data, in addition to an image sensing unit 101, RFID reader 102, image processor 103, database 104, characteristic quantity comparator 105, and display unit 106. As the information storage unit 107, it is possible to use various storage media such as a RAM, flash ROM, hard disk, memory card, USB memory, magnetic tape, optical disk, magnetic disk, and various DVD disks. The combined data is made up of image data obtained by the processing in the first or second embodiment, position information of an object in an image, and information unique to the object acquired from the database 104. The image data is stored in the form of a moving image or still image. It is also possible to store sensing condition information such as the time of sensing, and location information obtained from a system such as GPS.

In the first to third embodiments described above, when RFID tags having no special function are to be read, the image sensing unit senses an image and at the same time the RFID reader reads RFID tags within the image sensing range. The characteristic quantity information of an object corresponding to ID data of the read RFID tag is acquired from the database, and compared with characteristic quantities obtained by processing the sensed image, thereby finding matching portions. Therefore, even when a plurality of RFID tags is simultaneously read, it is possible to determine an object from which information is read.

Also, by displaying the information of an RFID tag in a position where the RFID tag exists in the sensed image, it is possible to provide an RFID read system which is easy to see by a human and widely applicable.

Furthermore, if an RFID tag is located in a position invisible from the reader or if an object is partially obstructed, the object can be detected, and its existence position can be determined. In addition, before characteristic quantities are compared, the characteristic quantities of an object are enlarged or reduced on the basis of the radio field intensity. As a consequence, the load of the process of comparison with the characteristic quantities of a sensed image can be reduced.

Fourth Embodiment

The fourth embodiment according to the present invention will be described in detail below with reference to the accompanying drawings.

If RFID tags described above can be attached to (adhered to, incorporated in, or embedded in) all objects, these objects can be easily identified by using the RFID reader.

Since, however, RFID tags and objects are originally different things, an RFID tag can be intentionally detached (peeled off or removed) from an object and singly used. In particular, a non-contact IC card (e.g., an ID card or entrance card) carried by a person can be extremely easily used by any third person. Also, an RFID tag may be detached from an object by some accident.

In addition, the RFID reader cannot always read RFID tags with 100% reliability. For example, the read accuracy may change owing to the positional relationship (the distance or direction) between a tag and the reader. Also, the read accuracy often largely decreases if a plurality of RFID tags overlaps each other, or if a conductor such as a metal is present around an RFID tag.

Accordingly, no high reliability can be obtained even when an object is identified or authenticated by using an RFID tag alone.

To solve this problem, Japanese Patent Laid-Open No. 2000-261751 (prior art 3), for example, discloses an image authentication system which is a combination of a camera and RF receiver (RFID reader). An RFID tag is read simultaneously with camera sensing, and combined data is generated by integrating the sensed image data and the read identifier. This assures that the image data and identifier are acquired at the same time. Prior art 3 claims that the user can confirm the existence of a predetermined object by viewing the image data, and can confirm that the identifier read simultaneously with the image data is a valid one attached to the object.

Unfortunately, this image authentication system described in prior art 3 does not well take account of a case in which a plurality of objects having RFID tags attached exists near the system. For example, if objects A, B, C, . . . , are arranged near each other, an image sensed by the camera described in prior art 3 may contain a plurality of objects.

Also, when an RFID tag of an object is read by using the RF receiver (RFID reader) described in prior art 3, it is highly likely to read identifiers ID_A, ID_B, ID_C, . . . , attached to objects A, B, C, . . . .

In addition, prior art 3 describes the use of a directional antenna as an antenna of the RF receiver. However, the direction range (within which RFID tags can be read) of this directional antenna cannot be controlled. Therefore, it is highly likely that all RFID tags arranged before the RF receiver are read, although there is no possibility that RFID tags arranged behind the RF receiver are read.

That is, when the system described in prior art 3 is used, an image containing objects A, B, C, . . . , and identifiers ID_A, ID_B, ID_C, . . . , are simultaneously read out, so the correspondence of each object contained in the image to its identifier cannot be known. Furthermore, even though the number of objects contained in the image is m (m is 1 or more), the number of read identifiers may be n (n is equal to or larger than m). This makes it more difficult to make a plurality of objects in an image correspond to a plurality of identifiers.

The fourth embodiment has been made in consideration of the above problems, and has as its object to match a sensing range with an RFID read range by controlling sensing parameters and RFID read parameters by synchronizing them with each other, when an RFID tag attached to a certain object is to be read while the object is being shot.

It is another object of the fourth embodiment to always shoot only one object and read its RFID tag by controlling sensing parameters and RFID read parameters by synchronizing them with each other, such that the number of objects contained in the sensed image or the number of read identifiers is one.

It is still another object of the fourth embodiment to find only a predetermined object by storing combined data made up of image data and an identifier, only when a read identifier partially or entirely matches a predetermined identifier, and store the time and location of finding to use them in tracking or managing the object.

The fourth embodiment will be explained by taking, as an example of an external apparatus, an object information acquisition apparatus which senses an object by a camera function, and simultaneously reads the information (identifier) of an RFID tag attached to the object by an RFID read function.

Figure 14:
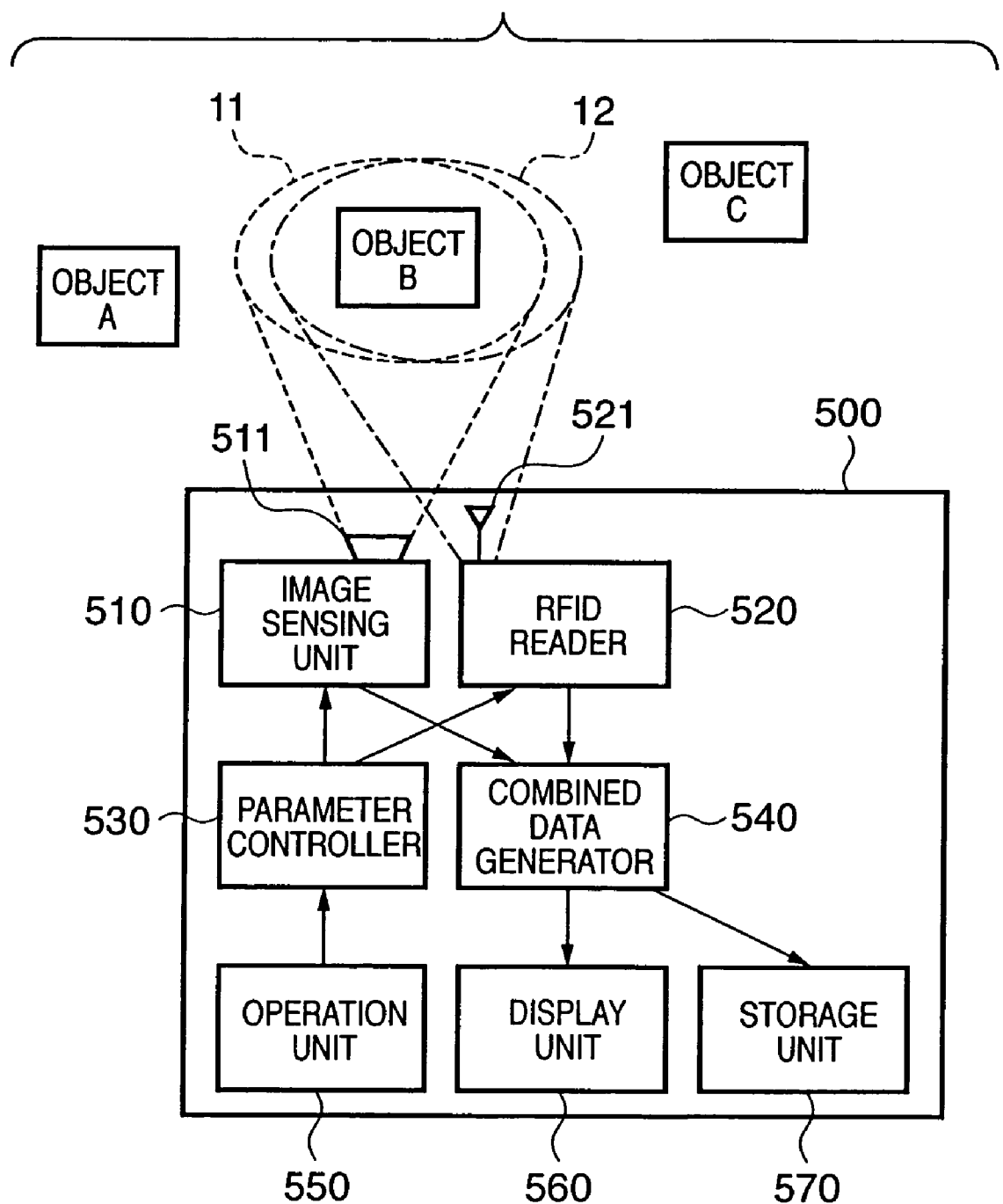
FIG. 14 is a block diagram showing an example of the arrangement of an object information acquisition system according to the fourth embodiment.

FIG. 14 is a block diagram showing an example of the arrangement of the object information acquisition apparatus according to the fourth embodiment. As shown in FIG. 14, an object information acquisition apparatus 500 includes an image sensing unit 510, RFID reader 520, parameter controller 530, combined data generator 540, operation unit 550, display unit 560, and storage unit 570. Details of these constituent elements will be explained in order below.

The image sensing unit 510 has a predetermined zooming mechanism 511, and can control the zooming magnification or the viewing angle and focal distance (focusing). Preferably, the image sensing unit 510 has a pan/tilt mechanism (not shown), and can change the direction of sensing in the horizontal and vertical directions.

The RFID reader 520 has a directional antenna 521 for communicating by radio only with RFID tags in a specific direction. The RFID reader 520 can control the range (to be referred to as an antenna direction range hereinafter) within which a radio field emitted from the directional antenna 521 radiates, and the antenna output level (the radiant intensity or reception intensity of an electromagnetic wave) having influence on the longitudinal coverage of the radio field.

The parameter controller 530 simultaneously controls sensing parameters of the image sensing unit 510 and RFID read parameters of the RFID reader 520 by synchronizing them with each other, in accordance with user's instructions input from the operation unit 550. The method of this synchronous control will be described later with reference to FIGS. 16 and 17. Note that instructions from the user are not always necessary, and the parameter controller 530 can automatically perform synchronous control of parameters in accordance with predetermined control rules.

The combined data generator 540 receives the sensed image data from the image sensing unit 510, and also receives the identifier of the read RFID tag from the RFID reader 520. After that, the combined data generator 540 generates combined data by combining the image data and identifier by a predetermined method. During this generation, it is also possible to perform predetermined conversion, e.g., encryption or data compression, on the combined data.

The display unit 560 receives the image data and identifier from the combined data generator 540, and displays, to the user, these data by methods respectively suited to the data. That is, the image data is displayed as a bitmap, and the identifier is displayed as characters or as a bitmap after being converted into an icon or graph by using a predetermined correspondence table.

Note that if the object information acquisition apparatus 500 is automatically or remotely controlled, the operation unit 550 and display unit 560 may be omitted.

The storage unit 570 stores the combined data received from the combined data generator 540 into a storage medium. As the storage medium, it is possible to use various media such as a RAM, flash ROM, hard disk, memory card, USB memory, magnetic tape, optical disk, magnetic disk, and various DVD disks.

Figure 15:
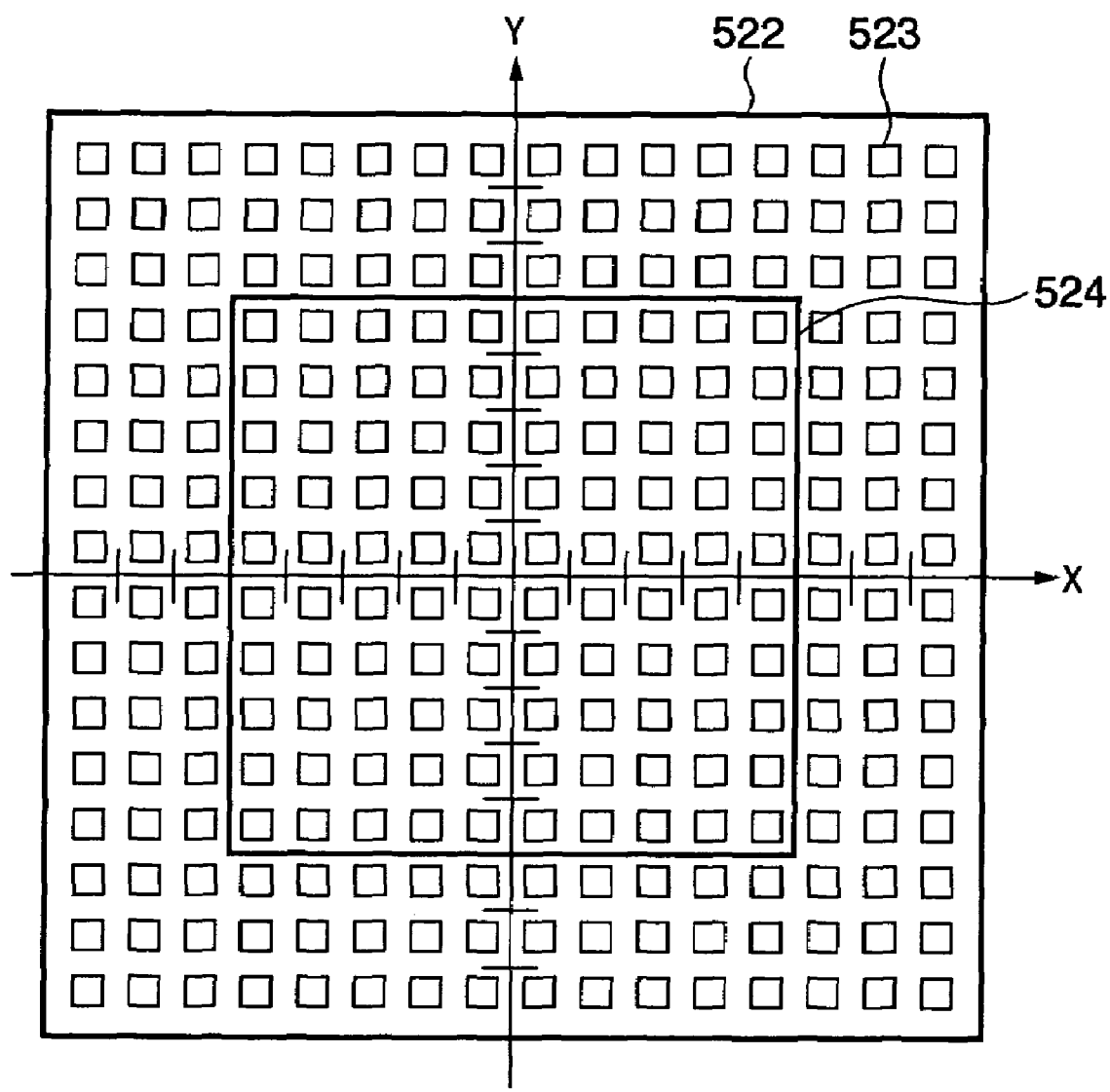
FIG. 15 is a view showing an example of the arrangement of a directional antenna 521 having controllable characteristics.

FIG. 15 is a view showing an example of the arrangement of the directional antenna 521 having controllable characteristics. As shown in FIG. 15, the directional antenna 521 is a patch array antenna 522 in which a large number of patch antennas 523 are arranged into an array. Each patch antenna 523 is a small square, and a total of 16×16=256 antennas are arranged. However, the number of elements can be freely increased or decreased to some extent, and has influence on the antenna characteristics.

Note that the directivity can be increased by increasing the number of elements not only in the patch array antenna 522 but also in any general array antenna. Note also that optimum values of the element size and the interval between the elements are determined by the carrier frequency of the radio field transmitted and received by the antenna.

In the patch array antenna 522 according to this embodiment, an electrical switch (not shown) is inserted between each element and a feeder wire so as to feed only elements within a predetermined range from the center of the antenna. This electrical switch can be implemented by a transistor or an MEMS (Micro Electro-Mechanical System) switch. A feeding range 524 indicates a range surrounding only fed elements.

FIG. 16 is a view showing a practical example of the correspondence of the zooming magnification of sensing as one sensing parameter to the feeding range of the antenna as one RFID read parameter. A sensing range when the zooming magnification of sensing is changed can be automatically measured by viewing the sensed image with human eyes or by image processing. Also, the sharpness (direction range) of the directivity of the radio field when the feeding range in the X and Y directions of the antenna is changed can be calculated by measuring the received radio field intensity at many points in a radio field dark room.

By measuring the sensing range and radio field direction range beforehand as described above, it is possible to select a plurality of correspondences of the zooming magnification of sensing to the feeding range of the antenna by which the sensing range and radio field direction range substantially match. Consequently, the correspondences as shown in FIG. 16 can be obtained.

Note that the numerical values indicated in the columns of the feeding range in the X and Y directions of the antenna correspond to the X- and Y-coordinates shown in FIG. 15 when the interval of the patch antennas 523 is "1".

FIG. 17 is a view showing a practical example of the correspondence of the focal distance (F-number) of sensing as one sensing parameter to the output level of the antenna as one RFID read parameter. The radio field longitudinal coverage when the output level of the antenna is changed can be calculated by measuring the received radio field intensity at many points within the direction range of the antenna in a radio field dark room.

Accordingly, the correspondences as shown in FIG. 17 can be obtained by selecting the output level of the antenna such that the focal distance (F-number) of sensing matches the radio field longitudinal coverage of the antenna.

Note that the numerical values in the columns shown in FIGS. 16 and 17 are examples, and change in accordance with, e.g., the part arrangement, structure, and manufacturing method of the object information acquisition apparatus 500. Therefore, it is preferable to perform measurements for each type of apparatus, and form different correspondences on the basis of the measurement results.

In the above arrangement, the parameter controller 530 controls the image sensing unit 510 and RFID reader 520 by synchronizing them with each other, so that a sensing range 11 in which the image sensing unit 510 senses an image and an RFID read range 12 in which the RFID reader 520 reads an RFID tag are substantially the same. In this way, only one object B can be contained in the sensing range 11 and RFID read range 12.

Control executed by the parameter controller 530 when the object information acquisition apparatus 500 senses a desired object and at the same time reads the identifier of an RFID tag adhered to the object will be explained below. This control will be explained by taking, as an example, a case in which the object B shown in FIG. 14 is sensed as a desired object.

Figure 18:
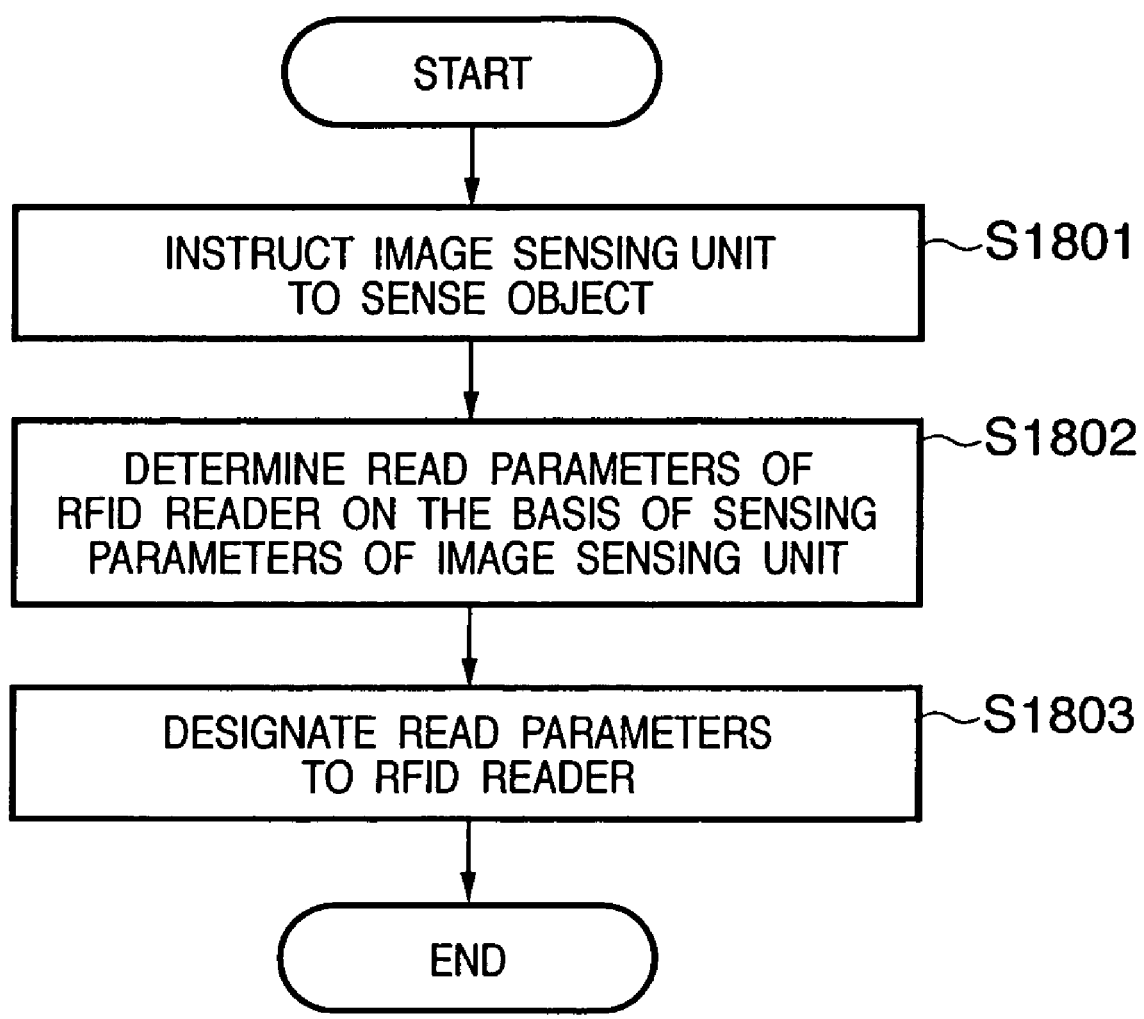
FIG. 18 is a flowchart showing the control sequence of a parameter controller 530 according to the fourth embodiment.

FIG. 18 is a flowchart showing the control sequence of the parameter controller 530 according to the fourth embodiment. First, in step S1801, the parameter controller 530 instructs the image sensing unit 510 to sense the object B. Accordingly, the image sensing unit 510 adjusts the zooming magnification and focal distance of the zooming mechanism

511 such that the sensing range equals the sensing range 11 of the object B, and senses only the object B.

Then, in step S1802, the parameter controller 530 receives the zooming magnification and focal distance as sensing parameters from the image sensing unit 510, and, on the basis of these sensing parameters, the parameter controller 530 determines the read parameters of the RFID reader 520 such that the sensing range 11 and the RFID read range 12 are substantially the same.

More specifically, if the zooming magnification of sensing is 1.5, the parameter controller 530 determines ±5 or less (the feeding range 524 shown in FIG. 15) as the feeding range in the X and Y directions from the correspondence of the zooming magnification to the feeding range of the antenna shown in FIG. 16. If the focal distance of sensing is 4.3, the parameter controller 530 determines 90% as the output level from the correspondence of the focal distance to the output level of the antenna shown in FIG. 17.

In step S1803, the parameter controller 530 designates the determined feeding range and output level to the RFID reader 520. Accordingly, the RFID reader 520 controls the directional antenna 521 in accordance with the feeding range and output level, and reads the identifier of the RFID tag adhered to the object B within the RFID read range 12.

In this manner, the image data obtained by sensing only the object B and the identifier read from the RFID tag adhered to the object B are input to the combined data generator 540. The combined data generator 540 generates combined data from the image data and identifier, and can display the combined data on the display unit 560 or store it in the storage unit 570.

That is, the combined data generator 540 generates combined data only when one object alone is sensed or one identifier alone is read. This improves the use value of the combined data. Note that if a plurality of objects is sensed, it is also possible to perform sensing again.

Also, the combined data generator 540 determines, by using an identifier determination unit (not shown), whether the read identifier partially or entirely matches a predetermined identifier, and, only when the two identifiers are found to match each other, stores combined data including the image data and identifier into the storage unit. As a consequence, only a predetermined object can be found.

Furthermore, the time of finding, the location of finding, and the like of a predetermined identifier are stored together with the combined data into the storage unit 570, and can be used to track the object or manage the storage location.

In this case, the time of finding of a predetermined identifier is acquired by using a system timer (not shown). Also, the location of finding of a predetermined identifier is the installation location of the object information acquisition apparatus which the user inputs from the operation unit 550 and stores in the storage unit 570 in advance, or is acquired by using a position measurement system such as a GPS (Global Positioning System).

Fifth Embodiment

The fifth embodiment according to the present invention will be described in detail below with reference to the accompanying drawings.

In the fifth embodiment, an object authentication apparatus which shoots an object by a camera function, and at the same time authenticates the object by reading the information (identifier) of an RFID tag adhered to the object by an RFID read function will be explained.

Figure 19:
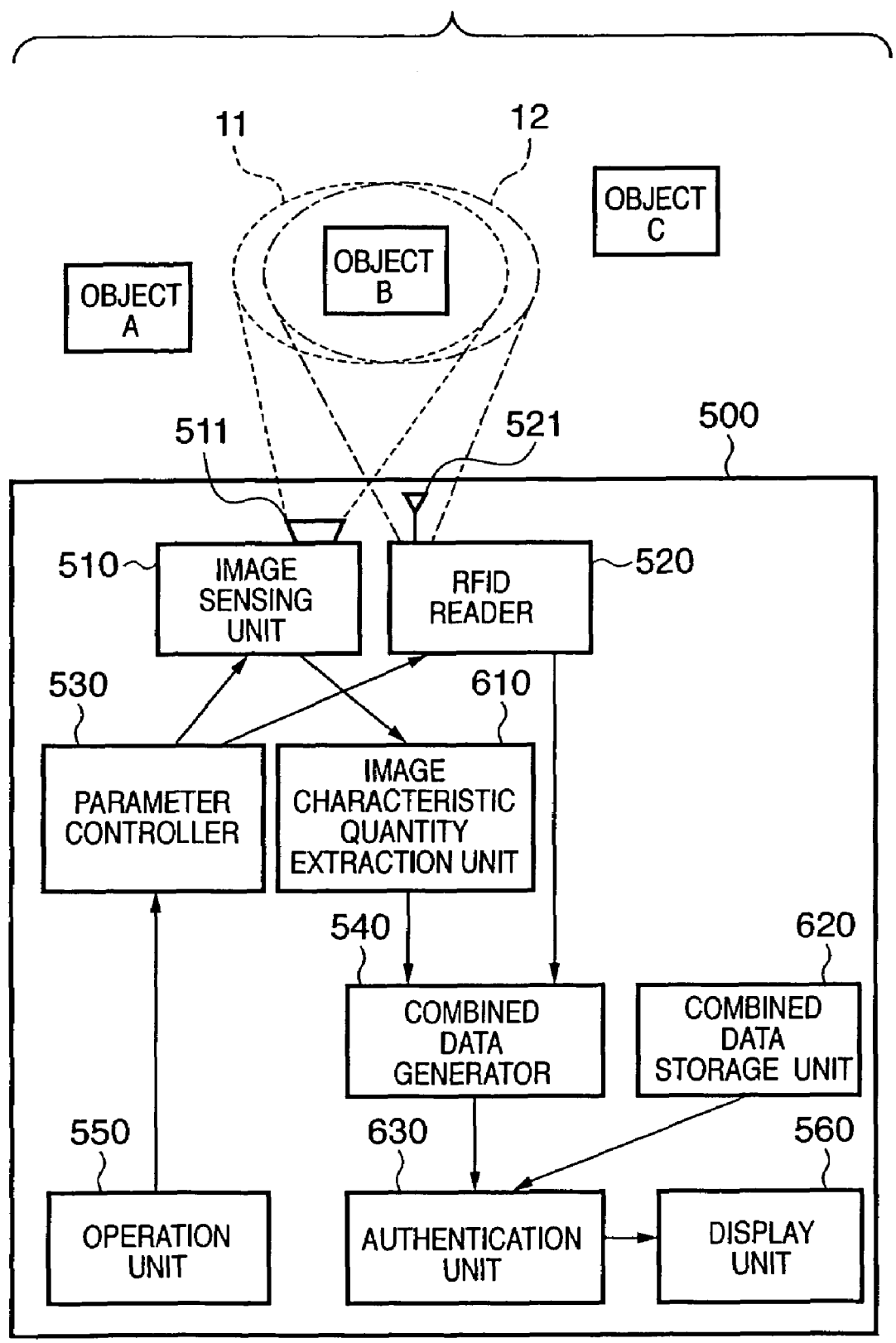
FIG. 19 is a block diagram showing an example of the arrangement of an object authentication apparatus according to the fifth embodiment.

FIG. 19 is a block diagram showing an example of the arrangement of the object authentication apparatus according to the fifth embodiment. Note that the same reference numerals as in FIG. 14 denote the same components in FIG. 19, and an explanation thereof will be omitted. Components different from FIG. 14 will be explained below.

As shown in FIG. 19, an object authentication apparatus 600 of the fifth embodiment additionally has an image characteristic quantity extraction unit 610, combined data storage unit 620, and authentication unit 630.

The image characteristic quantity extraction unit 610 receives sensed image data from an image sensing unit 510, and automatically extracts image characteristic quantities such as the shapes and colors of sensed objects by using a predetermined image processing algorithm.

A combined data generator 540 receives the image characteristic quantities from the image characteristic quantity extraction unit 610, and also receives the identifiers of read RFID tags from an RFID reader 520. After that, the combined data generator 540 generates combined data by combining the image characteristic quantities and identifiers by a predetermined method.

The combined data storage unit 620 stores a list of combined data made up of image characteristic quantities and identifiers obtained from various objects in advance.

That is, image sensing is performed for each of various objects beforehand, image characteristic quantities are extracted, and at the same time identifiers are read from RFID tags. Combined data are formed by combining the extracted image characteristic quantities and the read identifiers, and a list of the combined data is stored.

The authentication unit 630 collates the combined data received from the combined data generator 540 with the combined data list stored in the combined data storage unit 620, and authenticates an object. This authentication is performed by two stages, i.e., the collation of identifiers and the collation of image characteristic quantities. This makes the reliability much higher than that of authentication of only identifiers performed using the conventional RFID technique or authentication of only face images or fingerprint images performed using the conventional biometrics technique.

In the above arrangement, a parameter controller 530 controls the image sensing unit 510 and RFID reader 520 by synchronizing them such that a sensing range 11 in which the image sensing unit 510 senses an image and an RFID read range 12 in which the RFID reader 520 reads an RFID tag are substantially the same. The image characteristic quantity extraction unit 610 receives shot image data from the image sensing unit 510, and automatically extracts the image characteristic quantities such as the shape and color of a sensed object by using a predetermined image processing algorithm. The combined data generator 540 generates combined data by combining the image characteristic quantities from the image characteristic quantity extraction unit 610 and the identifier of an RFID tag from the RFID reader 520 by a predetermined method. The authentication unit 630 collates the combined data received from the combined data generator 540 with the combined data list stored in the combined data storage unit 620, thereby authenticating an object. The authentication result (authentication success or authentication failure) is displayed on a display unit 560.

Accordingly, when only one object is sensed and only one identifier is read, the combined data generator 540 generates combined data, and the authentication unit 630 authenticates the object. This improves the use value of the combined data.

The fourth and fifth embodiments can prevent read of RFID tags other than a sensed object.

The present invention has been described above by way of its preferred embodiments. However, the present invention is not limited to the above embodiments, but can be variously modified within the range described in the scope of claims.

CLAIM OF PRIORITY

This application claims priority from Japanese Patent Application Nos. 2004-220683 filed on Jul. 28, 2004 and 2004-220381 filed on Jul. 28, 2004, which are hereby incorporated by reference herein.

What is claimed is:

1. An information acquisition apparatus having a sensing device configured to sense an object, and a reading device configured to read information of a tag attached to the object, comprising:
an extracting device configured to extract information concerning a characteristic of an object in an image sensed by said sensing device;
a storage device configured to store the information of the tag attached to the object and predetermined information and the information concerning the characteristic of the object, such that the information of the tag corresponds to the information of the object; and
a discrimination device configured to discriminate a position of the object corresponding to the information of the tag read by said reading device, on the basis of the information concerning the characteristic of the object in the sensed image extracted by said extracting device and the information of the tag read by said reading device,
wherein said discrimination device performs the discrimination on the basis of the information stored in said storage device.

2. The apparatus according to claim 1, further comprising a display device configured to display the object in the sensed image such that the object is discriminable by the predetermined information thereof, on the basis of the discrimination by said discrimination device.

3. The apparatus according to claim 2, wherein said display device makes discrimination possible by superimposing, on the object in the sensed image, the predetermined information for identifying the object.

4. The apparatus according to claim 1, wherein said extracting device extracts the information concerning the characteristic of the object in the sensed image by predetermined image processing.

5. The apparatus according to claim 4, wherein the information concerning the characteristic of the object is at least one of an edge, a color, a luminance, a texture, the presence/absence of a motion, a shape, and a distance between characteristic points.

6. The apparatus according to claim 1, wherein the predetermined information of the object is one of information unique to the object and one of a name and model number of the object.

7. The apparatus according to claim 1, wherein on the basis of a radio field intensity which changes in accordance with a distance between said reading device and the tag of the object, the information concerning the characteristic of the object in the sensed image is enlarged or reduced.

8. The apparatus according to claim 1, wherein said reading device comprises an antenna having directivity corresponding to a sensing range of said sensing device.

9. The apparatus according to claim 1, further comprising a control device configured to control a sensing parameter of said sensing device and a read parameter of said reading device, such that a sensing range in which said sensing device senses an object matches a read range in which said reading device reads information of a tag.

10. The apparatus according to claim 9, wherein
said reading device comprises a directional antenna having directivity within a predetermined range centering around a viewing direction of said sensing device,
a direction range of said directional antenna is controllable as the read parameter, and a viewing angle or zooming magnification is controllable as the sensing parameter, and
said control device controls the direction range of said directional antenna by synchronizing the direction range with the viewing angle or zooming magnification.

11. The apparatus according to claim 9, wherein
said reading device comprises a directional antenna having directivity within a predetermined range centering around a viewing direction of said sensing device,
a focal distance is controllable as the sensing parameter, and an antenna output of said directional antenna is controllable as the read parameter, and
said control device controls the antenna output by synchronizing the antenna output with the focal distance.

12. An information acquisition apparatus having a sensing device configured to sense an object, and a reading device configured to read information of a tag attached to the object, comprising:
an extracting device configured to extract information concerning a characteristic of an object in an image sensed by said sensing device;
a discrimination device configured to discriminate a position of the object corresponding to the information of the tag read by said reading device, on the basis of the information concerning the characteristic of the object in the sensed image extracted by said extracting device and the information of the tag read by said reading device; and
a display device configured to display the object in the sensed image such that the object is discriminable by the predetermined information thereof, on the basis of the discrimination by said discrimination device, wherein said display device comprises a designating device configured to designate switching between the predetermined information of the object, and switches display to another predetermined information when switching is designated by said designating device.

13. A processing method by an information acquisition apparatus having a sensing device configured to sense an object and a reading device configured to read information of a tag attached to the object comprising:
a storage step of storing in a storage device the information of the tag attached to the object and predetermined information and the information concerning the characteristic of the object, such that the information of the tag corresponds to the information of the object,
an extraction step of extracting information concerning a characteristic of an object in a sensed image;
an identification step of identifying information of the tag attached to the object in the sensed image; and
a discrimination step of discriminating a position of the object corresponding to the information of the tag identified in the identification step, on the basis of the information concerning the characteristic of the object in the sensed image extracted in the extraction step, the information stored in said storage device, and the information of the tag identified in the identification step.

14. A program which causes a computer to execute the steps of an information acquisition apparatus processing method cited in claim 13.

15. A computer readable recording medium which records a program cited in claim 14.

16. A processing method by an information acquisition apparatus having a sensing device configured to sense an object and a reading device configured to read information of a tag attached to the object comprising:

an extraction step of extracting information concerning a characteristic of an object in a sensed image;

a discrimination step of discriminating a position of the object corresponding to the information of the tag read by said reading device, on the basis of the information concerning the characteristic of the object in the sensed image extracted at said extraction step, and the information of the tag read by said reading device;

and a display step of displaying the object in the sensed image such that the object is discriminable by the predetermined information thereof, on the basis of the discrimination by said discrimination step, wherein said display step designates switching between the predetermined information of the object, and switches display to another predetermined information when switching is designated.

17. A program which causes a computer to execute the steps of an information acquisition apparatus processing method cited in claim 16.

18. A computer readable recording medium which records a program cited in claim 17.

\* \* \* \* \*